US010794291B2

(12) United States Patent
Schwarz

(10) Patent No.: US 10,794,291 B2
(45) Date of Patent: Oct. 6, 2020

(54) GEARED TURBOFAN ARCHITECTURE FOR REGIONAL JET AIRCRAFT

(71) Applicant: United Technologies Corporation, Hartford, CT (US)

(72) Inventor: Frederick M. Schwarz, Glastonbury, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 923 days.

(21) Appl. No.: 15/015,198

(22) Filed: Feb. 4, 2016

(65) Prior Publication Data
US 2016/0195022 A1    Jul. 7, 2016

Related U.S. Application Data

(63) Continuation of application No. 14/188,733, filed on Feb. 25, 2014, now abandoned.
(Continued)

(51) Int. Cl.
*F02C 7/36* (2006.01)
*F02K 3/06* (2006.01)
*F02C 3/06* (2006.01)

(52) U.S. Cl.
CPC .............. *F02C 7/36* (2013.01); *F02C 3/06* (2013.01); *F02K 3/06* (2013.01); *F05D 2220/32* (2013.01);
(Continued)

(58) Field of Classification Search
CPC ... F01D 5/02; F01D 5/022; F01D 1/02; F01D 1/24; F01D 1/26; F02C 7/36; F02C 3/06;
(Continued)

(56) References Cited

U.S. PATENT DOCUMENTS 3,287,906 A    11/1966  McCormick
3,546,882 A *  12/1970  Berkey ............... F02C 7/18
                                                                415/79
(Continued)

FOREIGN PATENT DOCUMENTS

GB    1516041       6/1978
GB    2041090       9/1980
WO    2007038674    4/2007

OTHER PUBLICATIONS

Conference on Engineering and Physics: Synergy for Success 2006. Journal of Physics: Conference Series vol. 105. London, UK. Oct. 5, 2006.
(Continued)

*Primary Examiner* — Richard A Edgar
*Assistant Examiner* — Joshua R Beebe
(74) *Attorney, Agent, or Firm* — Carlson, Gaskey & Olds, P.C.

(57) ABSTRACT

A gas turbine engine according to an example of the present disclosure includes, among other things, a fan situated at an inlet of a bypass passage, and a core engine configured to drive the fan. The core engine includes a low pressure compressor section driven by a low pressure turbine section, and a high pressure compressor section driven by a high pressure turbine section. The fan has a fan diameter, Dfan, and the high pressure compressor section has a compressor diameter, Dcomp. The fan diameter Dfan and the compressor diameter Dcomp have an interdependence represented by a scalable ratio Dfan/Dcomp that is greater than about 4.5.

10 Claims, 2 Drawing Sheets

| PARAMETER | FAN | LPC | HPC | MECHANICAL TANGENTIAL VELOCITY RATIO [LPC IN f/sec TO FAN] | MECHANICAL TANGENTIAL VELOCITY RATIO [HPC IN ft/sec TO LPC] | FAN PRESSURE RATIO | OVERALL PRESSURE RATIO |
|---|---|---|---|---|---|---|---|
| RADIUS, in | 36.438 | 14.058 | 8.1195 | | | | |
| REDLINE, RPM | 3461 | 10600 | 24470 | | | | |
| REDLINE TIP SPEED ft/sec | 1100.5 | 1300.4 | 1733.8 | 1.18 | 1.333 | | |
| BUCKET CRUISE, RPM | 3069 | 9399 | 21622 | | | | |
| BUCKET CRUISE, ft/sec | 975.9 | 1153 | 1532.1 | 1.18 | 1.329 | 1.4 | 42.23 |
| SEA-LEVEL STATIC 86deg F RPM | 3208 | 9399 | 21622 | | | | |
| SEA-LEVEL STATIC 86deg F, ft/ | 1019.9 | 1205.1 | 1663.8 | 1.18 | 1.381 | 1.37 | 38.16 |

Related U.S. Application Data

(60) Provisional application No. 61/884,230, filed on Sep. 30, 2013.

(52) U.S. Cl.
 CPC ............... *F05D 2260/40311* (2013.01); *F05D 2260/606* (2013.01)

(58) Field of Classification Search
 CPC ................... F02K 3/06; F05D 2220/32; F05D 2260/40311; F05D 2260/606
 See application file for complete search history.

(56) References Cited

U.S. PATENT DOCUMENTS

| | | | |
|---|---|---|---|
| 3,754,484 | A | 8/1973 | Roberts |
| 3,892,358 | A | 7/1975 | Gisslen |
| 4,130,872 | A | 12/1978 | Harloff |
| 4,916,894 | A | 4/1990 | Adamson et al. |
| 5,218,816 | A * | 6/1993 | Plemmons ............... F01D 11/02 277/419 |
| 5,433,674 | A | 7/1995 | Sheridan et al. |
| 5,447,411 | A | 9/1995 | Curley et al. |
| 5,524,847 | A | 6/1996 | Brodell et al. |
| 5,778,659 | A | 7/1998 | Duesler et al. |
| 5,857,836 | A | 1/1999 | Stickler et al. |
| 5,915,917 | A | 6/1999 | Eveker et al. |
| 5,975,841 | A | 11/1999 | Lindemuth et al. |
| 6,223,616 | B1 | 5/2001 | Sheridan |
| 6,318,070 | B1 | 11/2001 | Rey et al. |
| 6,732,502 | B2 | 5/2004 | Seda et al. |
| 6,814,541 | B2 | 11/2004 | Evans et al. |
| 7,021,042 | B2 | 4/2006 | Law |
| 7,437,877 | B2 | 10/2008 | Kawamoto et al. |
| 7,591,754 | B2 | 9/2009 | Duong et al. |
| 7,824,305 | B2 | 11/2010 | Duong et al. |
| 7,926,260 | B2 | 4/2011 | Sheridan et al. |
| 8,075,261 | B2 | 12/2011 | Merry et al. |
| 8,205,432 | B2 | 6/2012 | Sheridan |
| 2008/0149445 | A1 | 6/2008 | Kern et al. |
| 2009/0293445 | A1 | 12/2009 | Ress, Jr. |
| 2010/0148396 | A1 | 6/2010 | Xie et al. |
| 2010/0219779 | A1 | 9/2010 | Bradbrook |
| 2010/0331139 | A1 | 12/2010 | McCune |
| 2011/0056208 | A1 | 3/2011 | Norris et al. |
| 2012/0171018 | A1 | 7/2012 | Hasel et al. |
| 2012/0189434 | A1* | 7/2012 | Strock ..................... F01D 5/284 415/173.4 |
| 2012/0198816 | A1* | 8/2012 | Suciu ..................... B64D 27/26 60/226.3 |
| 2012/0198817 | A1 | 8/2012 | Suciu et al. |
| 2013/0192200 | A1 | 8/2013 | Kupratis et al. |
| 2013/0287545 | A1 | 10/2013 | Suciu et al. |

OTHER PUBLICATIONS

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Wiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report. NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

(56) References Cited

OTHER PUBLICATIONS

Hughes, C. (2010). Geared turbofan technology. NASA Environmentally Responsible Aviation Project. Green Aviation Summit. NASA Ames Research Center. Sep. 8-9, 2010.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.
Dickey, T.A. and Dobak, E.R. (1972). The evolution and development status of ALF 502 turbofan engine. National Aerospace Engineering and Manufacturing Meeting. San Diego, California. Oct. 2-5, 1972.
Gunston, B. (Ed.) (2000). Jane's aero-engines, Issue seven. Coulsdon, Surrey, UK: Jane's Information Group Limited.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8), p. 32.
Hendricks, E.S. and Tong, M.T. (2012). Performance and weight estimates for an advanced open rotor engine. NASA/TM-2012-217710.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.
Zalud, T. (1998). Gears put a new spin on turbofan performance. Machine Design, 70(20), p. 104.
International Preliminary Report on Patentability for International Application No. PCT/US2014/050994 dated Apr. 14, 2016.
Supplementary European Search Report for European Application No. 14861230.2 dated Apr. 26, 2017.
Article. Gas power cycle—jet propulsion technology: A case study. Machine Design Magazine. Nov. 5, 1998.
Zalud, T. (1998). Gears put a new spin on turbofan performance. Machine Design, Nov. 5, 1998.
Gunston, B. (2000). Jane's aero-engines. Issue Seven, Mar. 2000.
Hendricks, E.S. and Tong, M.T. (2012). Performance and weight estimates for an advanced open rotor engine. NASA/TM-2012-2177100. Sep. 2012.
Guynn, M.D., et al. (2011). Refined exploration of turbofan design options for an advanced single-aisle transport. NASA/TM-2011-216883. Jan. 2011.

* cited by examiner

| PARAMETER | FAN | LPC | HPC | MECHANICAL TANGENTIAL VELOCITY RATIO [LPC IN f/sec TO FAN] | MECHANICAL TANGENTIAL VELOCITY RATIO [HPC IN ft/sec TO LPC] | FAN PRESSURE RATIO | OVERALL PRESSURE RATIO |
|---|---|---|---|---|---|---|---|
| RADIUS, in | 36.438 | 14.058 | 8.1195 | | | | |
| REDLINE, RPM | 3461 | 10600 | 24470 | | | | |
| REDLINE TIP SPEED ft/sec | 1100.5 | 1300.4 | 1733.8 | 1.18 | 1.333 | | |
| BUCKET CRUISE, RPM | 3069 | 9399 | 21622 | | | | |
| BUCKET CRUISE, ft/sec | 975.9 | 1153 | 1532.1 | 1.18 | 1.329 | 1.4 | 42.23 |
| SEA-LEVEL STATIC 86deg F RPM | 3208 | 9399 | 21622 | | | | |
| SEA-LEVEL STATIC 86deg F, ft/ | 1019.9 | 1205.1 | 1663.8 | 1.18 | 1.381 | 1.37 | 38.16 |

FIG.2

GEARED TURBOFAN ARCHITECTURE FOR REGIONAL JET AIRCRAFT

RELATED APPLICATION

This application is a continuation of U.S. application Ser. No. 14/188,733, filed Feb. 25, 2014, which claims the benefit of U.S. Provisional Application 61/884,230, filed Sep. 30, 2013.

BACKGROUND OF THE INVENTION

This application relates to a geared turbofan engine which may be particularly beneficial for application on regional jet aircraft.

Gas turbine engines are known and, typically, include a fan delivering air into a compressor and into a bypass duct as propulsion air. Air in the compressor is compressed and delivered into a combustion section where it is mixed with fuel and ignited. Products of this combustion pass downstream over turbine rotors driving them to rotate.

Historically, a turbine rotor drove an upstream compressor rotor and a fan rotor at a single speed.

More recently, it has been proposed to include a gear reduction between the fan rotor and the upstream compressor rotor such that the fan can rotate at slower speeds. This has provided a great deal of freedom to the designer of gas turbine engines.

To date, there has been little activity in tailoring of geared gas turbine engines to the particular application and aircraft which will utilize the gas turbine engine.

SUMMARY OF THE INVENTION

A gas turbine engine according to an example of the present disclosure includes a fan situated at an inlet of a bypass passage, and a core engine configured to drive the fan. The core engine includes a low pressure compressor section driven by a low pressure turbine section, and a high pressure compressor section driven by a high pressure turbine section. The gas turbine engine has a bypass ratio greater than about 10. The fan has a fan diameter, Dfan. The high pressure compressor section has a compressor diameter, Dcomp, and the fan diameter Dfan and the compressor diameter Dcomp have an interdependence represented by a scalable ratio Dfan/Dcomp that is greater than about 4.5.

In a further embodiment of any of the foregoing embodiments, the fan has fewer than 26 fan blades.

In a further embodiment of any of the foregoing embodiments, the fan diameter Dfan is greater than, or equal to, about 73 inches.

In a further embodiment of any of the foregoing embodiments, the high pressure turbine section includes two turbine stages.

In a further embodiment of any of the foregoing embodiments, a first ratio of a number of stages of the low pressure compressor section to a number of stages of the high pressure compressor section is greater than, or equal to, about 1.6.

In a further embodiment of any of the foregoing embodiments, the low pressure turbine section has a greater number of stages than the low pressure compressor section.

In a further embodiment of any of the foregoing embodiments, the first ratio is less than, or equal to, about 3.4.

In a further embodiment of any of the foregoing embodiments, the low pressure turbine has a pressure ratio that is greater than about 5.

In a further embodiment of any of the foregoing embodiments, the fan has a pressure ratio of less than, or equal to, about 1.45.

A gas turbine engine according to an example of the present disclosure includes a fan having 26 or fewer fan blades situated at a bypass passage and having a fan diameter, Dfan, and a core engine configured to rotate the fan. The core engine includes a low pressure compressor section upstream of a high pressure compressor section. The high pressure compressor section has a compressor diameter, Dcomp, and the fan diameter Dfan and the compressor diameter Dcomp have an interdependence represented by a scalable ratio Dfan/Dcomp that is greater than about 4.5. A low pressure turbine section is configured to drive the fan and the low pressure compressor section. The low pressure turbine section has a greater number of stages than the low pressure compressor section.

In a further embodiment of any of the foregoing embodiments, the gas turbine engine has a bypass ratio that is greater than about 10.

In a further embodiment of any of the foregoing embodiments, the low pressure turbine has a pressure ratio that is greater than about 5.

In a further embodiment of any of the foregoing embodiments, the fan diameter Dfan is greater than, or equal to, about 73 inches.

A further embodiment of any of the foregoing embodiments includes a high pressure turbine section configured to drive the high pressure compressor section, the high pressure turbine section including two stages.

In a further embodiment of any of the foregoing embodiments, a first ratio of a number of stages of the low pressure compressor section to a number of stages of the high pressure compressor section is greater than, or equal to, about 1.6 and is less than, or equal to, about 3.4.

In a further embodiment of any of the foregoing embodiments, the low pressure compressor section includes three stages.

A method of designing a gas turbine engine according to an example of the present disclosure includes providing a fan configured to deliver airflow to a bypass passage, providing a core engine configured to rotate the fan, the core engine including a low pressure compressor section driven by a low pressure turbine section, and a high pressure compressor section driven by a high pressure turbine section. A ratio of stages of the high pressure compressor section and stages of the low pressure compressor section are greater than, or equal to, about 1.6 and are less than, or equal to, about 3.4. The fan has a fan diameter, Dfan, the high pressure compressor section has a compressor diameter, Dcomp, and the fan diameter Dfan and the compressor diameter Dcomp have an interdependence represented by a scalable ratio Dfan/Dcomp that is greater than about 4.5.

In a further embodiment of any of the foregoing embodiments, the low pressure turbine section has a greater number of stages than the low pressure compressor section.

In a further embodiment of any of the foregoing embodiments, the high pressure turbine section includes two stages.

In a further embodiment of any of the foregoing embodiments, the fan diameter is greater than about 73 inches and the fan has fewer than 26 fan blades.

The various features and advantages of this invention will become apparent to those skilled in the art from the following detailed description of an embodiment. The drawings that accompany the detailed description can be briefly described as follows.

BRIEF DESCRIPTION OF THE DRAWINGS

FIG. 2 shows parameters of one example engine.

DETAILED DESCRIPTION

Figures 1A, 1B:
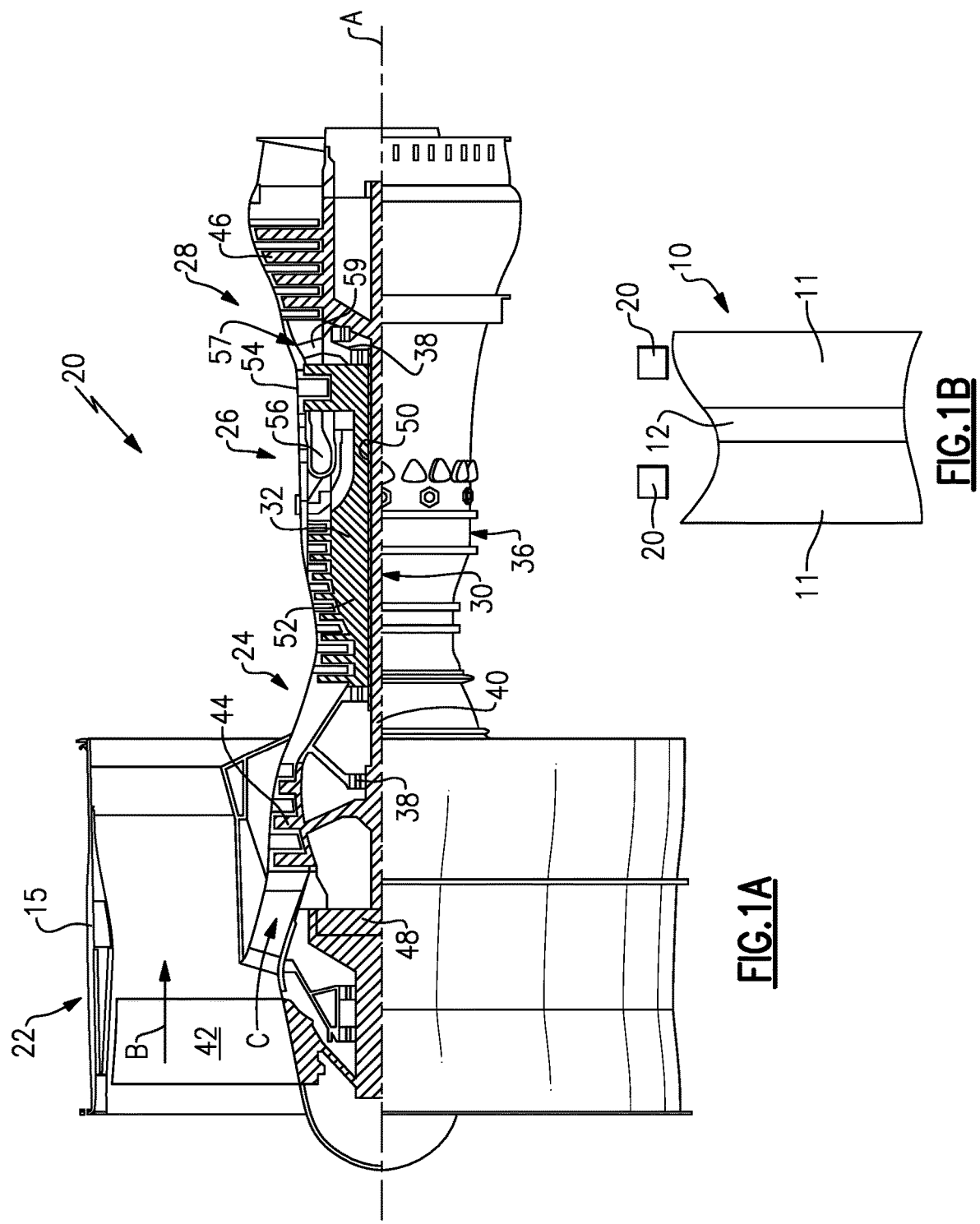
FIG. 1A schematically shows a gas turbine engine.
FIG. 1B schematically shows a regional jet aircraft.

FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^5$. The "Low corrected fan tip speed" as disclosed herein according to one non-limiting embodiment is less than about 1150 ft/second.

FIG. 1B schematically shows what may be called a regional jet aircraft 10 that mounts engines 20. A regional aircraft may be defined in a number of ways, however, one way is that they typically have a single aisle 12 between passenger sections 11. Another way may be a total flight length of less than 3000 nautical miles.

The engines utilized in such an aircraft have a particularly high percentage of time in take-off and climb relative to cruise. That is, compared to jet engines utilized on longer range aircraft, the engines 20 mounted on aircraft 10 will be spending more time at take-off and cruise conditions which are particularly challenging on components within the engine. Thus, there are elevated temperatures adjacent a last stage of the downstream or high pressure compressor 32 and elevated turbine cooling air temperatures utilized to cool components in the turbine sections. This disclosure tailors the gas turbine engine 20 such that it is uniquely structured to address the challenges faced by such an engine.

In such an engine, there may be a lower overall pressure ratio and a lower temperature at a downstream end of the downstream compressor rotor 52. The overall pressure ratio across the upstream compressor rotor 44 and the downstream compressor rotor 52 may, in some embodiments, be greater than or equal to 38, and may, in some embodiments, be less than or equal to 55. Turbine cooling airflow is typically taken from the downstream compressor rotor, and may be at a lower temperature, consistent with a moderate temperature at a downstream end of the downstream compressor rotor. The turbine cooling air temperature will still be high given the frequent occurrence of take-off and climb temperature exposure on turbine airfoils.

A greater portion of the total compression work is shifted to the downstream compressor rotor 52 relative to the upstream compressor rotor 44. Although, the lower pressure spool 30 may be more efficient than the higher pressure spool 32 doing more work with the downstream compressor rotor 52 reduces the temperature of the gas at the exit of the high pressure turbine section 54, thus, reducing the temperature reaching the low pressure turbine 46. The first blade of the low pressure turbine may be cast with a directionally solidified material or even a single crystal material.

Since there is more work done with the downstream compressor rotor 52, a ratio of compressor stages for the downstream compressor rotor 52 compared to the number of stages in the upstream compressor rotor 44 may be greater than or equal to about 1.6 and less than or equal to about 3.4. In one embodiment a ratio of the stages in the downstream compressor rotor 52 to those in the upstream compressor rotor was 2.7. The speed of the low pressure turbine 46 and the fan 42 may be closer than in other engines. Thus, a gear ratio of the gear reduction 48 may be greater than or equal to about 2.6 and less than or equal to about 3.3.

The low pressure turbine 46 may have only three or four stages since it is doing less work.

The gear reduction 48 may be a planet-type epicyclic gearbox where a sun and ring gear revolve around an engine centerline, whereas the intermediate planet gears rotate on stationary axes but do not revolve around the sun.

The downstream compressor rotor 52 speed is higher relative to the upstream compressor 44 speed since there is a greater amount of work performed at the downstream compressor rotor 52. Again, this reduces the temperature reaching the low pressure turbine 46. As an example, a redline tip speed of a first stage rotor in the downstream compressor rotor 52 to the redline tip speed of a first stage rotor in the upstream compressor rotor 44 is greater than or equal to about 1.18 and less than or equal to about 1.43 with the speeds measured in feet/second.

The higher pressure turbine rotor 54 may have two or three turbine sections.

The fan may be greater than about 73 inches in diameter and have fewer than about 26 blades. A pressure ratio across the fan may be less than about 1.45 and in some embodiments may be greater than or equal to about 1.35 and less than or equal to about 1.45.

FIG. 2 tabulates several variables, on one example engine, made according to the teachings of this disclosure. In the illustrated embodiment, the fan diameter is 72.876 inches and a diameter of the high pressure compressor is 16.239 inches, such that a ratio of the fan diameter to the high pressure compressor diameter is 4.488. In embodiments, the fan diameter may be greater than about 73 inches, such that the ratio of fan diameter to high pressure compressor diameter is greater than about 4.5.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine comprising:
a fan situated at an inlet of a bypass passage, the fan is a single-stage fan, the fan having fewer than 26 fan blades and an outer housing surrounding the fan to define the bypass passage;
a geared architecture;
a core engine configured to drive the fan, the core engine including:
a low pressure compressor section driven by a low pressure turbine section, wherein the low pressure turbine section drives the fan through the geared architecture; and
a high pressure compressor section driven by a high pressure turbine section;
wherein the gas turbine engine has a bypass ratio greater than 10, the fan has a fan diameter, Dfan, the high pressure compressor section has a compressor diameter, Dcomp, and the fan diameter Dfan and the compressor diameter Dcomp have an interdependence represented by a scalable ratio Dfan/Dcomp that is greater than 4.5; and
wherein the low pressure compressor section includes no more than three stages, the low pressure turbine section includes four stages, the high pressure turbine section includes two stages, and the high pressure compressor section includes eight stages.

2. The gas turbine engine as recited in claim 1, wherein the fan diameter Dfan is greater than, or equal to, about 73 inches.

3. The gas turbine engine as recited in claim 1, wherein the low pressure turbine has a pressure ratio that is greater than about 5.

4. The gas turbine engine as recited in claim 1, wherein the fan has a pressure ratio of less than, or equal to, about 1.45.

5. A gas turbine engine comprising:
a fan having 26 or fewer fan blades situated at a bypass passage, the fan is a single-stage fan, and having a fan diameter, Dfan, the fan section having an outer housing surrounding the fan to define the bypass passage;
a geared architecture; and
a core engine configured to rotate the fan, the core engine including:
a low pressure compressor section upstream of a high pressure compressor section, the high pressure compressor section having a compressor diameter, Dcomp, and the fan diameter Dfan and the compressor diameter Dcomp having an interdependence represented by a scalable ratio Dfan/Dcomp that is greater than 4.5;
a low pressure turbine section configured to drive the fan and the low pressure compressor section, the low pressure turbine section configured to drive the fan through the geared architecture;
wherein the low pressure compressor section includes no more than three stages, the low pressure turbine section includes four stages, a high pressure turbine section includes two stages, and the high pressure compressor section includes eight stages.

6. The gas turbine engine as recited in claim 5, wherein the gas turbine engine has a bypass ratio that is greater than about 10.

7. The gas turbine engine as recited in claim 6, wherein the low pressure turbine has a pressure ratio that is greater than about 5.

8. The gas turbine engine as recited in claim 5, wherein the fan diameter Dfan is greater than, or equal to, about 73 inches.

9. A method of designing a gas turbine engine comprising:
providing a single-stage fan section including a fan configured to deliver airflow to a bypass passage and an outer housing surrounding the fan to define the bypass passage;
providing a geared architecture; and
providing a core engine configured to rotate the fan, the core engine including:
  a low pressure compressor section driven by a low pressure turbine section, wherein the low pressure turbine section drives the fan through the geared architecture; and
  a high pressure compressor section driven by a high pressure turbine section;
  wherein the low pressure compressor section includes no more than three stages, the low pressure turbine section includes four stages, the high pressure turbine section includes two stages, and the high pressure compressor section includes eight stages; and
wherein the fan has a fan diameter, Dfan, the high pressure compressor section has a compressor diameter, Dcomp, and the fan diameter Dfan and the compressor diameter Dcomp have an interdependence represented by a scalable ratio Dfan/Dcomp that is greater than 4.5.

10. The method as recited in claim 9, wherein the fan diameter is greater than about 73 inches and the fan has fewer than 26 fan blades.

* * * * *